United States Patent
Sawasato et al.

(10) Patent No.: US 9,732,215 B2
(45) Date of Patent: Aug. 15, 2017

(54) BLOCK COPOLYMER COMPOSITION, AND SHEET

(71) Applicant: DENKI KAGAKU KOGYO KABUSHIKI KAISHA, Tokyo (JP)

(72) Inventors: Tadashi Sawasato, Ichihara (JP); Eiji Sato, Ichihara (JP); Hitoshi Nakazawa, Ichihara (JP); Shinya Uekusa, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 359 days.

(21) Appl. No.: 14/399,128

(22) PCT Filed: May 2, 2013

(86) PCT No.: PCT/JP2013/062778
§ 371 (c)(1),
(2) Date: Nov. 5, 2014

(87) PCT Pub. No.: WO2013/168679
PCT Pub. Date: Nov. 14, 2013

(65) Prior Publication Data
US 2015/0152257 A1 Jun. 4, 2015

(30) Foreign Application Priority Data
May 8, 2012 (JP) ................. 2012-106530

(51) Int. Cl.
| | |
|---|---|
| C08L 53/02 | (2006.01) |
| C08L 25/10 | (2006.01) |
| C08F 297/04 | (2006.01) |
| B32B 1/02 | (2006.01) |
| B65D 37/00 | (2006.01) |
| B65D 33/00 | (2006.01) |
| B65D 1/00 | (2006.01) |
| C08K 5/101 | (2006.01) |
| C08K 5/20 | (2006.01) |
| C08L 25/06 | (2006.01) |

(52) U.S. Cl.
CPC .............. *C08L 53/02* (2013.01); *B32B 1/02* (2013.01); *B65D 1/00* (2013.01); *B65D 33/00* (2013.01); *B65D 37/00* (2013.01); *C08F 297/04* (2013.01); *C08F 297/042* (2013.01); *C08F 297/044* (2013.01); *C08F 297/046* (2013.01); *C08F 297/048* (2013.01); *C08K 5/101* (2013.01); *C08K 5/20* (2013.01); *C08L 25/06* (2013.01); *C08L 25/10* (2013.01); *C08L 2201/10* (2013.01); *C08L 2205/025* (2013.01); *C08L 2205/03* (2013.01); *Y10T 428/13* (2015.01); *Y10T 428/1324* (2015.01); *Y10T 428/1328* (2015.01); *Y10T 428/1331* (2015.01); *Y10T 428/1334* (2015.01); *Y10T 428/1352* (2015.01)

(58) Field of Classification Search
CPC ................ C08F 297/04; C08F 297/042; C08F 297/044; C08F 297/046; C08F 297/048; C08L 25/04; C08L 25/08; C08L 25/10; B65D 1/00; B65D 33/00; B65D 37/00; B32B 1/02; Y10T 428/13; Y10T 428/1324; Y10T 428/1328; Y10T 428/1331; Y10T 428/1334; Y10T 428/1352
IPC .................................. B65D 1/00,33/00, 37/00
See application file for complete search history.

(56) References Cited

U.S. PATENT DOCUMENTS

| | | | |
|---|---|---|---|
| 5,089,558 A | 2/1992 | Hall et al. | ........................ 525/89 |
| 5,290,875 A * | 3/1994 | Moczygemba | ..... C08F 297/044 525/250 |
| 5,438,103 A * | 8/1995 | DePorter | ............. C08F 297/044 525/250 |

(Continued)

FOREIGN PATENT DOCUMENTS

| | | |
|---|---|---|
| CN | 1649923 A | 8/2005 |
| DE | 44 20 952 A1 | 12/1995 |

(Continued)

OTHER PUBLICATIONS

Chinese Office Action issued by the Chinese Patent Office, dated Feb. 3, 2016 in corresponding application 201380024337.X.

(Continued)

*Primary Examiner* — Walter B Aughenbaugh
(74) *Attorney, Agent, or Firm* — Stein IP, LLC

(57) ABSTRACT

A block copolymer composition with a good balance of physical properties suitable for various types of packaging such as food product containers, beverage containers, industrial containers and blister packs, having excellent transparency, gloss, strength, rigidity and formability, having excellent anti-blocking properties and anti-sticking properties, and excelling in the aforementioned properties even when used in mixture with vinyl aromatic hydrocarbon-type polymers is offered. A block copolymer composition of a vinyl aromatic hydrocarbon and a conjugated diene, wherein a block copolymer component (I) having a molecular weight peak in the range of molecular weight 150,000 to 300,000 and comprising tapered blocks has a conjugated diene content of 10 to 20 mass %; a block copolymer component (II) having a molecular weight peak in the range of molecular weight 50,000 to 140,000 and comprising tapered blocks has a conjugated diene content of 30 to 50 mass %; and a ratio (I)/(II) between molecular weight peak areas occupied by block copolymer component (I) and block copolymer component (II) in the block copolymer composition is 20/80 to 80/20.

14 Claims, No Drawings

(56) References Cited

U.S. PATENT DOCUMENTS

| | | | | |
|---|---|---|---|---|
| 5,928,782 | A | * 7/1999 | Albrecht | C09J 123/08 |
| | | | | 428/355 AC |
| 2004/0102576 | A1 | 5/2004 | Matsui et al. | 525/180 |
| 2005/0089702 | A1 | 4/2005 | Matsui et al. | 428/519 |
| 2005/0222331 | A1 | 10/2005 | Hoshi et al. | 525/88 |

FOREIGN PATENT DOCUMENTS

| | | |
|---|---|---|
| EP | 2 336 242 A1 | 6/2011 |
| JP | 59-184620 A | 10/1984 |
| JP | 6-92522 B2 | 11/1994 |
| JP | 2002-226670 A | 8/2002 |
| JP | 2003-41090 A | 2/2003 |
| JP | 2003-313259 A | 11/2003 |
| JP | 2005-139326 A | 6/2005 |
| JP | 2006-89593 A | 4/2006 |
| JP | 2006-143944 A | 6/2006 |
| JP | 2006-182820 A | 7/2006 |
| JP | 2006-232914 A | 9/2006 |
| JP | 4787480 B2 | 10/2011 |
| JP | 4812946 B2 | 11/2011 |
| WO | WO 02/38642 A1 | 5/2002 |

OTHER PUBLICATIONS

International Search Report issued Jul. 9, 2013, issued to the corresponding International Application No. PCT/JP2013/062778.
Extended European Search Report dated Nov. 26, 2015, issued to European application 13787388.1.
I.M. Kolthoff et al., Determination of Polystyrene in GR-S Rubber, Jun. 5, 1946, Journal of Polymer Science vol. 1 No. 5 pp. 429-433.

* cited by examiner

US 9,732,215 B2

BLOCK COPOLYMER COMPOSITION, AND SHEET

CROSS-REFERENCE TO RELATED APPLICATIONS

This application is a national stage of International Application No. PCT/JP2013/062778, filed May 2, 2013, which claims the benefit of priority to Japanese Application No. 2012-106530, filed May 8, 2012, in the Japanese Patent Office. All disclosures of the documents named above are incorporated herein by reference.

BACKGROUND OF THE INVENTION

1. Field of the Invention

The present invention relates to a block copolymer composition and sheet.

2. Description of the Related Art

Block copolymers consisting of vinyl aromatic hydrocarbons and conjugated dienes are widely used for various types of packaging such as food product containers, beverage containers, industrial containers (including various types of trays) and blister packs. Packaging often needs to be highly designable, and the content must be clearly visible, so the raw material of the packaging must have transparency and gloss. On the other hand, block copolymers consisting of vinyl aromatic hydrocarbons and conjugated dienes are often mixed with vinyl aromatic hydrocarbon polymers for use in packaging, so such resin compositions also require good transparency. Concerning this problem, Patent Documents 1 and 2 describe that the use of a block copolymer consisting of a vinyl aromatic hydrocarbon having a specific polymer structure and a conjugated diene is effective for solving the problem.

Furthermore, while the strength (tensile strength, impact strength) to withstand actual use is necessary for packaging applications, there are means of using block copolymers with a higher conjugated diene content for the purpose of conferring such physical properties. However, if block copolymers with a high conjugated diene content are used carelessly, the compatibility with the vinyl aromatic hydrocarbon polymers can be reduced, making it difficult to ensure good transparency and gloss.

On the other hand, as a general method of producing packaging, there is a method of melt-kneading the material, forming sheets, and thermoforming such as by vacuum forming, pressure forming or press forming to obtain various types of formed articles. These production processes include off-line systems in which sheets are formed and wound into rolls for storage, then the sheets are unwound from the rolls and thermoformed to obtain the formed articles, and in-line systems in which the sheets are formed and immediately thermoformed without being stored in rolls to obtain the formed articles. In off-line systems, the sheets are stored for a long time in mutual contact in roll form, so when using a block copolymer consisting of vinyl aromatic hydrocarbons and conjugated dienes, the sheets may stick together and become inseparable (hereinafter referred to as "blocking"). If blocking defects occur, the sheets cannot be used in subsequent thermoforming or the like, so anti-blocking properties are sought. Regarding this problem, Patent Documents 3 to 5 describe the use of a hydrocarbon wax in the block copolymer as a means for effectively preventing blocking.

However, depending on the structure of the block copolymer consisting of a vinyl aromatic hydrocarbon and a conjugated diene, there are cases in which sufficient anti-blocking effects cannot be obtained when arbitrarily choosing hydrocarbon waxes for use, and the use of hydrocarbon waxes suitable for the polymers used is desired.

Additionally, if the process involves storing the formed articles by stacking them on top of each other after forming the packaging, the contacting surfaces of the formed articles can stick together (hereinafter referred to as "sticking") when they are to be separated for use. This problem tends to occur when using a block copolymer consisting of a vinyl aromatic hydrocarbon and a conjugated diene. In particular, when the recesses in the packages are deep or when the shapes of the packages are more complex, the contact area between the formed articles increases and separation becomes more difficult, so good anti-sticking properties are needed. In recent years, the use of packaging with complicated shapes has been increasing, so better anti-sticking properties have been sought in materials.

RELATED ART

Patent Documents

Patent Document 1: JP 4787480 B
Patent Document 2: JP 2006-143944 A
Patent Document 3: JP 1958261 B
Patent Document 4: JP 2005-139326 A
Patent Document 5: JP 4812946 B

SUMMARY OF THE INVENTION

Problems to be Solved by the Invention

The invention has the purpose of offering a material with a good balance of physical properties suitable for various types of packaging (including various types of trays) such as food product containers, beverage containers, industrial containers and blister packs, having excellent transparency, gloss, strength, rigidity and formability, having excellent anti-blocking properties and anti-sticking properties, and excelling in the aforementioned properties even when used in mixture with vinyl aromatic hydrocarbon-type polymers.

Means for Solving the Problems

The present invention is directed to a block copolymer composition consisting of a vinyl aromatic hydrocarbon and a conjugated diene, wherein a conjugated diene content in a block copolymer component (I) having a molecular weight peak in the range of molecular weight 150,000 to 300,000 and comprising tapered blocks is 10 to 20 mass %; a conjugated diene content in a block copolymer component (II) having a molecular weight peak in the range of molecular weight 50,000 to 140,000 and comprising tapered blocks is 30 to 50 mass %; and a ratio (I)/(II) between molecular weight peak areas occupied by block copolymer component (I) and block copolymer component (II) in the block copolymer composition is 20/80 to 80/20; more preferably a block copolymer composition wherein block copolymer component (I) has a molecular weight peak in the range of molecular weight 180,000 to 290,000 and the conjugated diene content in block copolymer component (I) is 10 to 15 mass %; block copolymer component (II) has a molecular weight peak in the range of molecular weight 50,000 to 140,000 and the conjugated diene content in block copolymer component (II) is 30 to 50 mass %; and the ratio (I)/(II) between molecular weight peak areas occupied by block copolymer component (I) and block copolymer component (II) in the block copolymer composition is 40/60 to 60/40. Additionally, block copolymer component (I) comprises a vinyl aromatic hydrogen polymer block part in a molecular weight range of 80,000 to 150,000; and block copolymer component (II) comprises a vinyl aromatic hydrocarbon polymer block part in a molecular weight range of 5,000 to 40,000. Furthermore, in the present invention, the block copolymer composition comprises a total amount of 0.03 to 1.0 mass % of a single hydrocarbon wax, or at least one chosen from among hydrocarbon waxes, stearyl stearate, stearic acid monoglyceride, erucamide and behenamide; the hydrocarbon wax is preferably a microcrystalline wax, a synthetic wax, or a mixture of a microcrystalline wax and a synthetic wax having a melting point of 60 to 120° C., and is contained in the block copolymer composition in an amount of 0.03 to 0.5 mass %; the hydrocarbon wax has a melting point of 80 to 110° C.; and the block copolymer composition comprises a total amount of 0.03 to 0.5 mass % of a lubricant chosen from among stearyl stearate, stearic acid monoglyceride, erucamide and behenamide. Additionally, the present invention is directed to a resin composition comprising the above-described block copolymer composition and a vinyl aromatic hydrocarbon polymer at a mass ratio of 30/70 to 100/0; a sheet using this material; and a container thereof.

Effects of the Invention

By using the block copolymer composition of the present invention, it is possible to achieve excellent transparency, gloss, strength, rigidity and formability whether the block copolymer composition is used alone, or used as a mixture of the block copolymer composition and a vinyl aromatic hydrocarbon polymer. Furthermore, in addition to the above properties, it is possible to achieve better anti-blocking properties and anti-sticking properties when used as sheets and formed articles, and packaging of various shapes can be easily produced and used.

Additional aspects and/or advantages of the invention will be set forth in part in the description which follows and, in part, will be obvious from the description, or may be learned by practice of the invention.

MODES FOR CARRYING OUT THE INVENTION

The block copolymer composition of the present invention has a block copolymer consisting of a vinyl aromatic hydrocarbon and a conjugated diene as a constituent.

Examples of vinyl aromatic hydrocarbons that can be used as the block copolymer of the present invention include styrene, o-methylstyrene, p-methylstyrene, p-tert-butylstyrene, 2,4-dimethylstyrene, 2,5-dimethylstyrene, α-methylstyrene, vinylnaphthalene and vinylanthracene, among which styrene is preferred.

Examples of conjugated dienes used as the block copolymer of the present invention include 1,3-butadiene, 2-methyl-1,3-butadiene (isoprene), 2,3-dimethyl-1,3-butadiene, 1,3-pentadiene and 1,3-hexadiene, among which 1,3-butadiene and isoprene are preferred.

The block copolymer of the present invention can be produced by polymerizing monomers of vinyl aromatic hydrocarbons and conjugated dienes in a dehydrated organic solvent using an organic lithium compound as an initiator, in the presence of a randomizing agent if needed. The organic solvent may be an aliphatic hydrocarbon such as butane, pentane, hexane, isopentane, heptane, octane and iso-octane, an alicyclic hydrocarbon such as cyclohexane, methylcyclohexane and ethylcyclohexane, or an aromatic hydrocarbon such as benzene, toluene, ethylbenzene and xylene, among with cyclohexane is preferred.

The organic lithium compound is a compound having at least one lithium compound bound to the molecule, which may be a monofunctional organic lithium compound such as ethyllithium, n-propyllithium, n-butyllithium, sec-butyllithium or tert-butyllithium, or a polyfunctional organic lithium compound such as hexamethylene dilithium, butadienyl dilithium or isoprenyl dilithium, among which n-butyllithium is preferred.

While tetrahydrofuran (THF) is mainly used as the randomizing agent, ethers, amines, thioethers, phosphoamides, alkylbenzene sulfonic acid salts and potassium or sodium alkoxides may also be used. Examples of ethers include dimethylether, diethylether, diphenylether, diethylene glycol dimethylether and diethylene glycol dibutylether. The amines may be tertiary amines such as trimethylamine, triethylamine and tetramethylethylene diamine, or alternatively an intracyclic amine. Aside therefrom, triphenylphosphine, hexamethylphosphoramide, potassium (or sodium) alkylbenzene sulfonate and potassium (or sodium) butoxide can be used as randomizing agents.

The amount of these randomizing agents added should be 10 parts by mass or less, preferably 0.001 to 8 parts by mass with respect to 100 parts by mass of all added monomers. The time of addition may be before the polymerization reaction, or during the polymerization. Additionally, further addition is possible as needed.

To the block copolymer solution obtained in this way is added a polymerization inhibiting agent such as water, alcohol or carbon dioxide in an amount sufficient to inactivate the active terminals, thereby inactivating the block copolymer. The method for recovering the block copolymer from the block copolymer solution may be any method, including a method of pouring these solutions into a poor solvent such as methanol to induce precipitation, a method of vaporizing the solvent with a heating roller or the like to induce precipitation (drum dryer method), a method of concentrating the solution in a concentrator, then removing the solvent with a vent-type extruder, and a method of dispersing the solution in water, then blowing steam to heat and remove the solvent (steam stripping method).

When mixing together a plurality of block copolymers to form a block copolymer composition, the mixing method may be a method of blending the desolventized block copolymers, then loading them into an extruder and knead-mixing while melting, a method of blending solutions of the block copolymers before desolventizing, then desolventizing to obtain a mixture, or a method of polymerizing a plurality of block copolymers in a single reaction chamber. The block copolymer composition of the present invention may use any of the above mixing methods.

The block copolymer composition of the present invention may contain various types of additives as needed. Examples of additives include plasticizers, anti-oxidants, weathering agents, lubricants, anti-static agents, anti-clouding agents and pigments.

Examples of plasticizers include those collectively known as liquid paraffins, such as paraffin oils, nujol, mineral oils, mineral spirits, mineral turpentine, white oils, white spirits, white mineral oils, petroleum spirits, mineral thinners, petroleum spirits, aqueous paraffin and mineral oil white.

Examples of anti-oxidants include phenolic anti-oxidants such as 2-tert-butyl-6-(3-tert-buty-2-hydroxy-5-methylbenzyl)-4-methylphenylacrylate, 2-[1-(2-hydroxy-3,5-di-tert-pentylphenyl)ethyl]-4,6-di-tert-pentylphenylacrylate and n-octadecyl-3-(4-hydroxy-3,5-di-tert-butylphenyl)propionate, and phosphoric antioxidants such as 2,2'-methylenebis(4,6-di-tert-butylphenyl)octylphosphite and tris(2,4-di-tert-butylphenyl)phosphite.

Examples of weathering agents include benzotriazolic UV absorbers such as 2-(2-hydroxy-3-tert-butyl-5-methylphenyl)-5-chlorobenzotriazole and hindered amine type weathering agents such as tetra-cis(2,2,6,6-tetramethyl-4-piperidyl)-1,2,3,4-butane tetracarboxylate. Furthermore, the aforementioned white oils and silicone oils can also be added as weathering agents.

Examples of lubricants include fatty acids, fatty acid esters, fatty acid amides, glycerin fatty acid esters (glycerides), sorbitan fatty acid esters, pentaerythritol fatty acid esters, sucrose fatty acid esters and propylene glycol fatty acid esters, as well as synthetic waxes such as polyethylene waxes and Fischer-Tropsch waxes, and natural waxes such as paraffin wax and microcrystalline wax, as hydrocarbon waxes.

Examples of anti-static agents include anionic surfactants such as dinonylnaphthylsulfonic acid, cationic surfactants such as quaternary ammonium compounds, as well as zwitterionic surfactants and non-ionic surfactants. The method for using the anti-static agent may be either kneading into the resin or applying to the surface of the formed article after forming. Anti-static agents may be used within such a range as not to detract from the anti-blocking properties and anti-sticking properties.

Examples of the anti-clouding agent include fatty acid esters of polyhydric alcohols such as glycerin fatty acid esters, polyglycerin fatty acid esters, sorbitan fatty acid esters and their ethylene oxide adducts. The method of using the anti-clouding agent may be either kneading into the resin or applying to the surface of the formed article after forming. Anti-clouding agents may be used within such a range as not to detract from the anti-blocking properties and anti-sticking properties.

The block copolymer composition of the present invention may contain a filler as needed. Examples of the effects to be obtained by adding a filler include high strength, high rigidity, anti-blocking properties, anti-sticking properties, lubrication, thermal insulation, conductivity, electrical insulation, cost reductions and coloring, and an inorganic filler, an organic filler or both may be used depending on the purpose.

Examples of fillers include organic fillers such as high-impact polystyrenes (HIPS), crosslinked beads of vinyl aromatic hydrocarbon-(meth)acrylic acid esters and/or (meth)acrylic acid copolymers and crosslinked beads of vinyl aromatic hydrocarbon copolymers, and inorganic fillers such as silica beads and quartz beads. In order to achieve good transparency, it is preferable to use HIPS, crosslinked beads of vinyl aromatic hydrocarbon-(meth)acrylic acid esters and/or (meth)acrylic acid copolymers, and crosslinked beads of vinyl aromatic hydrocarbon copolymers. Their blending ratio should be 10 parts by mass or less, preferably 0.5 to 5 parts by mass, more preferably 0.1 to 3 parts by mass with respect to 100 parts by mass of the resin composition. These may be used within such a range as not to detract from the appearance of the formed articles.

The block copolymer composition of the present invention essentially comprises a block copolymer component (I) and a block copolymer component (II) of different structures.

The block copolymer compositions of the present invention comprise a block copolymer component (I) having a molecular weight peak in the range of molecular weights 150,000 to 300,000 in terms of molecular weight distribution obtained by gel permeation chromatography. If the molecular weight peak of the block copolymer component (I) becomes less than 150,000, the fluidity can be too high, thereby lowering the formability, and if polymer blocks of vinyl aromatic hydrocarbons are incorporated into the block copolymer, the molecular weight of the polymer blocks can be reduced, leading to reduced transparency when used in a mixture with vinyl aromatic hydrocarbons. If more than 300,000, then the fluidity can become too low, reducing the formability. A more preferable molecular weight range for the block copolymer component (I) is 180,000 to 290,000.

The conjugated diene content in block copolymer component (I) is preferably 10 to 20 mass %, more preferably 10 to 15 mass %. At less than 10 mass %, the strength can be too low, and when mixed with a block copolymer component with a high conjugated diene content, the compatibility can be reduced, leading to lower transparency. At more than 20 mass %, the rigidity can be too low, and when used in mixture with a vinyl aromatic hydrocarbon polymer, the compatibility can be reduced, leading to lower transparency.

The conjugated diene content in the block copolymer components can be obtained by a general, publicly known halogen addition method. Examples of common halogen addition methods include methods of dissolving in a solvent capable of completely dissolving the sample, then adding an excess quantity of iodine monochloride/carbon tetrachloride, reacting well and titrating the unreacted iodine monochloride with a sodium thiosulfate/ethanol solution, and computing the conjugated diene content from the resulting double bond content.

The block copolymer composition of the present invention comprises a block copolymer component (II) having a molecular weight peak in the range of molecular weight 50,000 to 140,000. When the molecular weight peak of block copolymer component (II) is less than 50,000, the strength can be too low, and if more than 140,000, the fluidity can be reduced, leading to lower transparency. A more preferable molecular weight range for block copolymer component (II) is 60,000 to 100,000.

The conjugated diene content of the block copolymer component (II) is preferably 30 to 50 mass %, more preferably 30 to 40 mass %. At less than 30 mass %, the strength can be too low, which is not desirable. At more than 50 mass %, the transparency can be reduced, and the compatibility with block copolymer component (I) can be reduced, leading to lower transparency.

The block copolymer composition of the present invention comprises the above-described block copolymer component (I) and block copolymer component (II). Block copolymer component (I) excels in rigidity and compatibility with vinyl aromatic hydrocarbon polymers, while block copolymer component (II) excels in reinforcement. The ratio (mass ratio) between block copolymer component (I) and block copolymer component (II) is roughly the same as the molecular weight peak area ratio by gel permeation chromatography. The molecular weight peak area ratio (I)/(II) between block copolymer component (I) and (II) is preferably 20/80 to 80/20, more preferably 40/60 to 60/40. If the peak area ratio of block copolymer component (I) is below 20, or if the peak area ratio of block copolymer component (II) exceeds 80, the rigidity becomes too low, and the compatibility with the vinyl aromatic hydrocarbon polymer is reduced, leading to lower transparency. If the peak area ratio of block copolymer component (I) is greater than 80, or if the peak area ratio of block copolymer component (II) is less than 20, the strength can be too low.

The molecular weight of vinyl aromatic hydrocarbon polymer blocks in block copolymer component (I) is preferably 80,000 to 150,000. If less than 80,000, the compatibility with the vinyl aromatic hydrocarbon copolymer is reduced, and at more than 150,000, the compatibility with block copolymer component (II) is reduced, in both cases leading to lower transparency.

The aforementioned vinyl aromatic hydrocarbon polymer blocks preferably have a vinyl aromatic hydrocarbon content of at least 90 mass %. At less than 90 mass %, the compatibility with the vinyl aromatic hydrocarbon polymer is reduced, thereby lowering the transparency. The range is more preferably as least 95 mass %, even more preferably 100 mass %.

One means of establishing the presence of vinyl aromatic hydrocarbon polymer blocks is to judge from the molecular weight of components obtained by osmic acid decomposition of the block copolymer, in accordance with the literature (the method described in I. M. Kolthoff, et al., *Journal of Polymer Science*, Volume 1, 429 (1946)).

The molecular weight of the vinyl aromatic hydrocarbon polymer block portion of the aforementioned block copolymer component (II) should preferably be 5,000 to 40,000. If less than 5,000 or more than 40,000, the strength can be reduced, which is not desirable.

Block copolymer component (I) and block copolymer component (II) contained in the block copolymer composition of the present invention both comprise tapered blocks wherein the component ratios of the vinyl aromatic hydrocarbon and the conjugated diene change from one end to the other end of the block. The monomer mass ratio (vinyl aromatic hydrocarbons/vinyl aromatic hydrocarbons) occupied by each block copolymer composition in all of the main tapered blocks is not particularly restricted, but they are preferably close together, and more preferably the same value. If the difference in monomer mass ratio of the respective block copolymer compositions is large, the compatibility can become worse, leading to reduced transparency.

The tapered blocks are obtained by simultaneous addition of both vinyl aromatic hydrocarbon and conjugated diene monomers to the polymerization active terminals at the time of block formation. The change (slope) in component ratio in the tapered blocks can be adjusted by the mass ratio of the vinyl aromatic hydrocarbons and conjugated dienes at the time of simultaneous addition, and the addition of a randomizing agent.

The block copolymer of the present invention can have any of the following structures in order to achieve the above-described structural properties.

(a) A-C
(b) C-A
(c) A-C-A
(d) A-B-C
(e) B-C-A
(f) A-B-C-A
(g) A-C-C
(h) C-C-A
(i) A-C-C-A
(j) A-B-C-B-C-A
(k) A-B-C-C-A
(l) A-C-B-C-A
(m) A-C-X
(n) A-C-A-X
(o) A-B-C-X
(p) A-B-C-A-X

Here, A represents a vinyl aromatic hydrocarbon polymer block, B represents a conjugated diene polymer block, and C represents a vinyl aromatic hydrocarbon and conjugated diene copolymer block, which is a tapered block in which the component ratio of the vinyl aromatic hydrocarbon and the conjugated diene monotonously varies, continuously from one end of the block to the other end. Additionally, X represents a coupling center. The combination of structures that can be taken by the block copolymer components (I) and (II) of the present invention is preferably as follows.

(a) (I) A-C-A, (II) A-C
(b) (I) A-C-A, (II) C-A
(c) (I) A-B-C-A, (II) A-B-C
(d) (I) A-B-C-A, (II) B-C-A
(e) (I) A-C-C-A, (II) A-C-C
(t) (I) A-C-C-A, (II) C-C-A
(g) (I) A-B-C-C-A, (II) A-B-C
(h) (I) A-B-C-C-A, (II) C-A
(i) (I) A-B-C-C-A, (II) C-C-A
(j) (I) A-C-B-C-A, (II) A-C
(k) (I) A-C-B-C-A, (II) B-C-A
(l) A-C-X, (II) A-C
(m) (I) A-C-A-X, (II) A-C-A
(n) (I) A-B-C-X, (II) A-B-C
(o) (I) A-B-C-A-X, (II) A-B-C-A

While the Vicat softening temperature of the block copolymer composition of the present invention is not particularly restricted, the Vicat softening temperature, as measured at a load of 10 N in accordance with ISO 306 (JIS K7206), should preferably be 60 to 100° C. At less than 60° C., the block copolymer composition alone is more susceptible to blocking, and the formability is undesirably reduced. At more than 100° C., the strength of the block copolymer composition is too low and high-temperature formation occurs, leading to reduced formability which is undesirable. A more preferable range of Vicat softening temperatures is 70 to 90° C.

While the bending strength of the block copolymer composition of the present invention is not particularly restricted, the maximum bending stress (bending strength) withstood by a test piece when measured at a testing speed of 2 mm/min in accordance with ISO178 (JIS K7171) should be 20 to 60 MPa. At less than 20 MPa, the rigidity is too low, leading to reduced formability when thermoforming the sheet, and at more than 60 MPa, the flexibility of the formed article is reduced and the strength is reduced, which is undesirable. The bending strength is more preferably in the range of 30 to 50 MPa.

The haze of the block copolymer composition of the present invention is not particularly limited, but the haze as measured in accordance with ISO 14782 (JIS K7136) should preferably be 7 or less. If more than 7, the transparency is greatly reduced when mixing a vinyl aromatic hydrocarbon into the block copolymer composition, which is undesirable. The haze is more preferably in the range of 5 or less.

The gloss of the block copolymer composition of the present invention is not particularly restricted, but the gloss as measured in accordance with JIS K7105 should preferably be at least 150. At less than 150, the macroscopic glossiness is reduced, leading to lower transparency, and less designability, which is undesirable. The gloss should more preferably be in the range of at least 160.

The block copolymer composition of the present invention may be used with a hydrocarbon wax alone, or a hydrocarbon wax in conjunction with a lubricant chosen from among stearyl stearate, stearic acid monocglyceride, erucamide and behenamide, in order to effectively confer anti-blocking properties and anti-sticking properties that are necessary in various types of packaging. The lubricants other than the above-mentioned hydrocarbon wax may be used alone, or may be a combination of two or more types. The amount of lubricant added to the block copolymer composition should preferably be a total added amount of 0.03 to 1.0 mass %, more preferably 0.03 to 0.5 mass % of the hydrocarbon wax and a total of 0.03 to 0.5 mass % of the lubricant chosen from among stearyl stearate, stearic acid monocglyceride, erucamide and behenamide. At less than 0.03 mass %, anti-blocking properties, anti-sticking properties, or both cannot be adequately achieved, and at more than 0.5 mass %, there is excessive bleed-out of the lubricant to the formed article surface, raising the risk of a poor appearance.

Examples of hydrocarbon waxes include synthetic waxes such as the aforementioned polyethylene wax and Fischer-Tropsch wax, and natural waxes such as paraffin wax and microcrystalline wax. Paraffin wax, microcrystalline wax and synthetic wax are preferable, and microcrystalline wax, synthetic wax or a mixture thereof are more preferable.

The block copolymer composition of the present invention preferably comprises a hydrocarbon wax for efficiently achieving excellent anti-blocking properties. More preferable is a microcrystalline wax, synthetic wax or a mixture of a microcrystalline wax and a synthetic wax having a melting point of 60 to 120° C., more preferably the melting point of the hydrocarbon wax is 80 to 110° C. If the melting point is less than 60° C., then sufficient anti-blocking properties cannot be obtained, and at more than 120° C., the transferability of the lubricant to the formed article surface is reduced, which is not desirable.

The block copolymer composition of the present invention preferably uses at least one type of lubricant chosen from among stearic acid monoglyceride, stearyl stearate, erucamide and behenamide for efficiently achieving excellent anti-sticking properties. Since anti-sticking properties are obtained to a certain degree even with the aforementioned hydrocarbon waxes, they can be used in packaging applications of common shapes, but in specialized applications for packages with deep grooves or complicated shapes, the contact area between formed articles increases and high anti-sticking properties are required, so application becomes more difficult. More preferably, the aforementioned hydrocarbon wax can be used in conjunction with at least one type of lubricant chosen from among stearic acid monoglyceride, stearyl stearate, erucamide and behenamide.

Furthermore, the block copolymer composition of the present invention may use the aforementioned anti-static agent as needed for the purpose of providing anti-static properties and improving the separation properties between formed articles, within a range such as not to detract from the anti-blocking properties, anti-sticking properties and the appearance. The amount of anti-static agent to be added should preferably be 0.03 to 3 mass % in the block copolymer composition. At less than 0.03 mass %, sufficient anti-static properties cannot be achieved, and at more than 3 mass %, there is excessive bleed-out of the anti-static agent, which leads to a poor appearance and is therefore undesirable.

The block copolymer composition obtained in this way may be used in mixture with a vinyl aromatic hydrocarbon polymer as needed, the block copolymer composition/vinyl aromatic hydrocarbon polymer being mixable at a mass ratio of 30/70 to 100/0. If the mass ratio of the block copolymer composition is lower than 30, the strength becomes too low for practical use.

Examples of vinyl aromatic hydrocarbon polymers that can be mixed with the block copolymer composition of the present invention include vinyl aromatic hydrocarbon polymers, copolymers of vinyl aromatic hydrocarbons and acrylic acid esters, and copolymers of vinyl aromatic hydrocarbons and methyl methacrylate, among which representative examples are polystyrenes, styrene/n-butylacrylate copolymers, and styrene/methyl methacrylate copolymers. Among these, polystyrenes are most commonly used.

The block copolymer composition of the present invention may be used favorably in various types of formed articles, whether alone or as a mixture with vinyl aromatic hydrocarbon polymers. Examples of the method of production of the formed articles include a T-die process, inflation with an annular die, casting or calendering to produce a sheet, then subjecting the sheet to a publicly known thermoforming process such as vacuum forming, pressure forming, press forming or hot-plate forming to obtain various types of formed articles, or subjecting to publicly known injection molding processes to obtain various types of formed articles. They can also be used in applications for storing formed articles by stacking.

The sheet using a resin composition consisting of a block copolymer composition and a vinyl aromatic hydrocarbon polymer according to the present invention is not particularly restricted as to its thickness, but will normally be used in the range of 0.05 mm to 5 mm. If the thickness is less than 0.05 mm, the rigidity and strength of the sheet will be too low, and if more than 5 mm, the sheet can be difficult to thermoform into formed articles and is thus impractical. More preferably, the thickness is 0.1 mm to 1.5 mm.

In the resin composition consisting of a block copolymer composition and a vinyl aromatic hydrocarbon polymer according to the present invention, the amount of vinyl aromatic hydrocarbon polymer added is chosen in consideration of the balance of strength, rigidity and cost needed in the packaging. Examples of important physical properties not dependent on the amount of vinyl aromatic hydrocarbon polymer added are haze and gloss.

As an example of a preferable range of haze in the sheets used in the resin composition of the present invention, the haze in a sheet of thickness 0.6 mm should preferably be 7% or less, and more preferably 5% or less. If the haze exceeds 7%, there is an extreme decrease in the macroscopic transparency, reducing the designability, which is undesirable.

Furthermore, as an example of a preferable range of gloss in the sheets used in the resin composition of the present invention, the gloss in a sheet of thickness 0.6 mm should preferably be at least 150, and more preferably at least 160. If the gloss is less than 150, there is an extreme reduction in the macroscopic glossiness, reducing the designability, which is undesirable.

An indicator of the strength of the sheet is the tensile elongation when using a tension testing machine. As an example of a preferable range of tensile elongation in a sheet using the resin composition of the present invention, the tensile elongation in the manufacturing direction of the sheet measured at a tension speed of 10 mm/min in a 0.6 mm thick sheet should preferably be at least 20%. If less than 20%, the strength of the sheet can be deficient, making it difficult to use in practice. The aforementioned tensile elongation is more preferably in the range of at least 50%.

An indicator of the rigidity of the sheet is the modulus of tensile elasticity obtained in the same manner as the measurement of the tensile elongation. As an example of a preferable range for the modulus of tensile elasticity in a sheet using the resin composition of the present invention, the modulus of tensile elasticity in the manufacturing direction of the sheet measured at a tension speed of 10 mm/min in a 0.6 mm thick sheet should preferably be 500 to 2500 MPa, more preferably 1000 to 2000 MPa. If less than 500 MPa, the rigidity of the sheet and the glass transition temperature become too low, leading to reduced formability. If more than 2500 MPa, the strength of the sheet can be too low, making it difficult to use in practice.

As an example of a preferable range for the impact strength of a sheet using the resin composition of the present invention, the impact strength when using an impact weight of radius 10 mm in accordance with ASTM D-3420 in a 0.6 mm thick sheet should preferably be 2 to 10 kJ/m. If less than 2 kJ/m, the impact strength can be too low, and if more than 10 kJ/m, the rigidity of the sheet may be too low, leading to reduced formability. The impact strength is more preferably in the range of 2 to 7 kJ/m.

EXAMPLES

Herebelow, the present invention will be explained in detail using examples, but the present invention is not to be construed as being limited by these examples.

Production of Block Copolymers (A)-(O) of Reference Examples 1-15

Reference Example 1

Production of Block Copolymer (A)

(1) 490 kg of cyclohexane were loaded into a reaction container (2) While stirring at an internal temperature of 30° C., 1640 mL of n-butyllithium (10 mass % cyclohexane solution) were added, 12.0 kg of styrene monomer were added, and the temperature was raised to polymerize.

(3) At an internal temperature of 50° C., 36.5 kg of butadiene monomer and 49.6 kg of styrene monomer were added, then the internal temperature was raised within a range not greatly exceeding 80° C. to polymerize.

(4) At an internal temperature of 60° C., 111.9 kg of styrene monomer were added and polymerized.

(5) At an internal temperature of 75° C., a solution of 33.7 g of epoxidized soybean oil (Adeka Adekacizer O-130P) diluted with 5 L of cyclohexane was added and reacted to complete the polymerization.

Reference Example 2

Production of Block Copolymer (B)

(1) 250 kg of cyclohexane were loaded into a reaction container.

(2) While stirring at an internal temperature of 30° C., 750 mL of n-butyllithium (10 mass % cyclohexane solution) were added, 34.0 kg of styrene monomer were added, and the temperature was raised to polymerize.

(3) At an internal temperature of 40° C., 12.0 kg of butadiene monomer were added and polymerized.

(4) At an internal temperature of 50° C., 54.0 kg of styrene monomer were added to complete the polymerization.

Reference Example 4 (Block Copolymer (D)) and Reference Example 11 (Block Copolymer (K)) were produced with reference to the production method of Reference Example 2. The amounts of the raw materials loaded are shown in Table 1.

Reference Example 3

Production of Block Copolymer (C)

(1) 518 kg of cyclohexane were loaded into a reaction container.

(2) While stirring at an internal temperature of 30° C., 1360 mL of n-butyllithium (10 mass % cyclohexane solution) were added, 9.1 kg of styrene monomer were added, and the temperature was raised to polymerize.

(3) At an internal temperature of 65° C., 3.6 kg of butadiene monomer were added, then the temperature was raised to polymerize.

(4) At an internal temperature of 40° C., 27.3 kg of butadiene monomer and 23.3 kg of styrene monomer were simultaneously added, and the internal temperature was raised within a range not greatly exceeding 80° C. to polymerize.

(5) At an internal temperature of 40° C., 118.7 kg of styrene monomer were added to complete the polymerization.

Reference Example 7 (Block Copolymer (G)) and Reference Example 8 (Block Copolymer (H)) were produced with reference to the production method of Reference Example 3. The amounts of the raw materials loaded are shown in Table 1.

Reference Example 5

Production of Block Copolymer (E)

(1) 367.5 kg of cyclohexane were loaded into a reaction container.

(2) While stirring at an internal temperature of 30° C., 780 mL of n-butyllithium (10 mass % cyclohexane solution) were added, 5.5 kg of styrene monomer were added, and the temperature was raised to polymerize.

(3) At an internal temperature of 40° C., 16.9 kg of butadiene monomer and 22.8 kg of styrene monomer were simultaneously added, and the internal temperature was raised within a range not greatly exceeding 70° C. to polymerize.

(4) At an internal temperature of 40° C., 112.3 kg of styrene monomer were added to complete the polymerization.

Reference Example 6

Production of Block Copolymer (F)

(1) 367.5 kg of cyclohexane were loaded into a reaction container.

(2) While stirring at an internal temperature of 30° C., 780 mL of n-butyllithium (10 mass % cyclohexane solution) were added, 5.5 kg of styrene monomer were added, and the temperature was raised to polymerize.

(3) At an internal temperature of 40° C., 16.9 kg of butadiene monomer and 22.8 kg of styrene monomer were simultaneously added, and the internal temperature was raised within a range not greatly exceeding 70° C. to polymerize.

(4) At an internal temperature of 40° C., 112.3 kg of styrene monomer were added to complete the polymerization.

Reference Example 9

Production of Block Copolymer (I)

(1) 259 kg of cyclohexane were loaded into a reaction container.
(2) While stirring at an internal temperature of 30° C., 2020 mL of n-butyllithium (10 mass % cyclohexane solution) were added, 9.1 kg of styrene monomer were added, and the temperature was raised to polymerize.
(3) At an internal temperature of 60° C., 2.7 kg of butadiene monomer were added to polymerize.
(4) At an internal temperature of 40° C., 42.8 kg of butadiene monomer and 36.4 kg of styrene monomer were simultaneously added, and the internal temperature was raised within a range not greatly exceeding 70° C. to complete the polymerization.

Reference Example 15 (Block Copolymer (O)) was produced with reference to the production method of Reference Example 9. The amounts of the raw materials loaded are shown in Table 1.

Reference Example 10

Production of Block Copolymer (J)

(1) 270 kg of cyclohexane were loaded into a reaction container.
(2) While stirring at an internal temperature of 30° C., 3980 mL of n-butyllithium (10 mass % cyclohexane solution) were added, 22.0 kg of styrene monomer were added, and the temperature was raised to polymerize.
(3) At an internal temperature of 40° C., 45.0 kg of butadiene monomer and 33.0 kg of styrene monomer were simultaneously added, and the internal temperature was raised within a range not greatly exceeding 65° C. to complete the polymerization.

Reference Example 12 (Block Copolymer (L)), Reference Example 13 (Block Copolymer (M)) and Reference Example 14 (Block Copolymer (N)) were produced with reference to the production method of Reference Example 10. The amounts of the raw materials loaded are shown in Table 1.

The structural characteristics of the block copolymers A to O obtained in this way are shown in Table 1. Regarding the structure of the block copolymer in Table 1, A1 and A2 respectively represent polystyrene blocks, B represents a polybutadiene block, C represents a tapered block consisting of styrene and butadiene, Cr represents a random block consisting of styrene and butadiene, and X represents a coupling center. The molecular weights of the respective block copolymers, the proportion of conjugated diene in the block copolymer, and the molecular weight of the polymer block portion of the vinyl aromatic hydrocarbon were measured in accordance with the methods described below.

TABLE 1

|  |  | Ref Ex 1 | Ref Ex 2 | Ref Ex 3 | Ref Ex 4 | Ref Ex 5 | Ref Ex 6 | Ref Ex 7 | Ref Ex 8 |
|---|---|---|---|---|---|---|---|---|---|
|  | Block Copolymer Name | (A) | (B) | (C) | (D) | (E) | (F) | (G) | (H) |
|  | Block Copolymer Class | (I) | — | (I) | — | (I) | — | (I) | — |
|  | Block Copolymer Structure | A1-C-A2-X | A1-B-A2 | A1-B-C-A2 | A1-B-A2 | A1-C-A2 | A1-Cr-A2 | A1-B-C | A1-B-C-A2 |
| Amount Added | n-butyllithium solution [ml] | 1640 | 750 | 1360 | 350 | 780 | 990 | 1550 | 630 |
|  | Styrene monomer amount [kg] in block A1 | 12 | 34 | 9.1 | 53.5 | 5.5 | 3.6 | 68 | 4.6 |
|  | Styrene monomer amount [kg] in block C or (Cr) | 49.6 | — | 23.3 | — | 22.8 | 156.6 | 102 | 36.4 |
|  | Butadiene monomer amount [kg] in bock C (or Cr) | 36.5 | — | 27.3 | — | 16.9 | 16.2 | 6 | 18.2 |
|  | Butadiene monomer amount [kg] in block B | — | 12 | 3.6 | 19.8 | — | — | 24 | 1.8 |
|  | Styrene monomer amount [kg] in block A2 | 111.9 | 54 | 118.7 | 6.7 | 112.3 | 3.6 | — | 30 |
|  | Epoxidized soybean oil amount [g] | 33.7 | — | — | — | — | — | — | — |
|  | Conjugated diene content proportion [mass %] | 17.4 | 12 | 17 | 24.8 | 10.7 | 9 | 15 | 22 |
| Peak Top Mol Wt. [g/mol] | Main component in mol. wt. range 150000-300000 | 157000 | 166000 | 156000 | — | 236000 | 231000 | 176000 | 217000 |
|  | Main component in mol. wt. range 50000-140000 | — | — | — | — | — | — | — | — |
|  | Polystyrene block in mol. wt. range 80000-150000 | 84000 | 91000 | 103000 | — | 81000 | — | 87000 | 75000 |
|  | Polystyrene block in mol. wt. range 5000-40000 | 9100 | — | 8000 | 27000 | — | — | 37000 | 10000 |

|  |  | Ref Ex 9 | Ref Ex 10 | Ref Ex 11 | Ref Ex 12 | Ref Ex 13 | Ref Ex 14 | Ref Ex 15 |
|---|---|---|---|---|---|---|---|---|
|  | Block Copolymer Name | (I) | (J) | (K) | (L) | (M) | (M) | (O) |
|  | Block Copolymer Class | (II) | — | — | (II) | - | (II) | (II) |
|  | Block Copolymer Structure | A1-B-C | A1-C | A1-B-A2 | A1-C | A1-C | A1-C | A1-B-C |
| Amount Added | n-butyllithium solution [ml] | 2020 | 3980 | 1860 | 2390 | 2260 | 2400 | 1860 |
|  | Styrene monomer amount [kg] in block A1 | 9.1 | 22 | 104.2 | 19.1 | 22 | 23.1 | 18.2 |
|  | Styrene monomer amount [kg] in block C or (Cr) | 36.4 | 33 | — | 79.7 | 23 | 34.7 | 107.4 |

TABLE 1-continued

|  |  |  |  |  |  |  |  |  |
|---|---|---|---|---|---|---|---|---|
|  | Butadiene monomer amount [kg] in bock C (or Cr) | 42.8 | 45 | — | 58.7 | 55 | 47.2 | 51 |
|  | Butadiene monomer amount [kg] in block B | 2.7 | — | 42.6 | — | — | — | 5.5 |
|  | Styrene monomer amount [kg] in block A2 | — | — | 13.3 | — | — | — | — |
|  | Epoxidized soybean oil amount [g] | — | — | — | — | — | — | — |
|  | Conjugated diene content proportion [mass %] | 50 | 45 | 26.6 | 37.3 | 55 | 45 | 31 |
| Peak Top Mol Wt. [g/mol] | Main component in mol. wt. range 150000-300000 | — | — | — | — | — | — | — |
|  | Main component in mol. wt. range 50000-140000 | 63000 | 34000 | 105000 | 77000 | 62000 | 77000 | 127000 |
|  | Polystyrene block in mol. wt. range 80000-150000 | — | — | — | — | — | — | — |
|  | Polystyrene block in mol. wt. range 5000-40000 | 8100 | 7200 | 8700 | 9900 | 13800 | 17400 | 13300 |

[Molecular Weight Measurement]

The molecular weight of the block copolymer was measured using the below-described GPC measuring device and conditions.
Apparatus: High-speed GPC apparatus HLC-8220 (product of Tosoh)
Column: PL Gel Mixed-B, three in a row
Temperature: 40° C.
Detection: differential refractive index
Solvent: tetrahydrofuran
Concentration: 2 mass %
Standard curve: Produced using standard polystyrene (product of PL) and measuring the peak molecular weights of the main components having molecular weight peaks in the range of polystyrene-converted molecular weight 70,000 to 150,000 and 150,000 to 350,000. Additionally, the weight-average molecular weight was measured under the same measuring conditions as a polystyrene-converted value.

[Measurement of Conjugated Diene Proportion]

The conjugated diene content mass % of the block copolymer was measured by the below-described method.
(1) 0.1 g of the sample were dissolved in 50 mL of chloroform.
(2) 25 mL of iodine monochloride/carbon tetrachloride were added and mixed well, then the result was let stand in darkness for 1 hour.
(3) 75 mL of a 2.5% potassium iodide solution were added and mixed well.
(4) A 20% sodium thiosulfate/ethanol solution was added while stirring well, until the color of the solution became pale yellow.
(5) About 0.5 mL of 1% starch indicator was added, and the result was again titrated with 20% sodium thiosulfate/ethanol solution until colorless.
(6) After titration, the amount a [mL] of sodium thiosulfate/ethanol solution consumed was measured.

In order to make corrections by measurement of blanks, steps (1) to (6) were performed for chloroform alone, and the consumed amount b [mL] of the sodium thiosulfate/ethanol solution was measured.

The conjugated diene content was computed from the measured values in accordance with the following formula.

$$\text{Conjugated diene content}(\%) = [(b-a) \times 0.1 \times c \times 27/1000]/W \times 100$$

c: titer of 20% sodium thiosulfate/ethanol solution
W: sample amount [g]

[Molecular Weight Measurement of Vinyl Aromatic Hydrocarbon Polymer Block]

The molecular weight of the vinyl aromatic hydrocarbon polymer block portion in the block copolymer was measured by a GPC measuring apparatus for vinyl aromatic hydrocarbon block parts obtained by the above-described osmic acid decomposition method. The low molecular weight component was measured by a GPC measuring apparatus using a low molecular weight column.

The above-described block copolymers (A) to (O) were polymerized, then two or more types of solutions were blended in the state of a polymer solution, and the solvent was removed using a direct extruder to obtain a block copolymer composition. The general physical properties of the block copolymer composition are shown in Table 2 and Table 3. The proportion of conjugated dienes in the block copolymer composition was measured in accordance with the above-described method, and the haze, nominal tensile strain at break, bending elasticity, Vicat softening temperature and bending strength were measured in accordance with the following methods.

[Vicat Softening Temperature Measurement]

The Vicat softening temperature of the block copolymer composition was measured at a load of 10 N in accordance with ISO306 (JIS K7206) using a 148 HDA Heat Distortion Tester (product of Yasuda Seiki).

[Bending Strength Measurement]

The bending strength of the block copolymer composition was measured as the maximum bending stress (bending strength) withstood by the testing piece when measured at a testing speed of 2 mm/min in accordance with ISO 178 (JIS K7171) using a Bendograph II (product of Toyo Seiki).

[Elongation (Nominal Tensile Strain at Break) Measurement]

The elongation (nominal tensile strain at break) of the block copolymer composition was measured in accordance with ISO 527-2 (JIS K7161, 7162) using a tension tester (product of TSE).

[Haze Measurement]

The haze of the block copolymer composition was measured in accordance with ISO 14782 (JIS K7136) using a Haze Meter NDH300A (product of Nippon Denshoku Industries).

[Gloss Measurement]

The gloss of the sheet was measured as the gloss value at an angle of incidence of 60° in accordance with ISO 2813 (JIS Z8741) using a Gloss Meter VG2000 (product of Nippon Denshoku Industries).

TABLE 2

|  |  | Ex 1 | Ex 2 | Ex 3 | Ex 4 |
|---|---|---|---|---|---|
| Block Copolymer Composition Blend | Type of block copolymer component (I) | (A) | (C) | (E) | (G) |
|  | Molecular weight peak area ratio [%] | 51 | 32 | 48 | 65 |
|  | Type of block copolymer component (II) | (L) | (I) | (L) | (N) |
|  | Molecular weight peak area ratio [%] | 49 | 68 | 52 | 35 |
| General Physical Properties of Block Copolymer Composition | Vicat softening temperature [° C.] | 81 | 70 | 80 | 79 |
|  | Bending strength [MPa] | 36 | 31 | 35 | 33 |
|  | Elongation (nominal tensile strain at break) [%] | 205 | 331 | 221 | 214 |
|  | Haze [%] | 2.1 | 3.7 | 1.5 | 1.8 |
|  | Gloss [%] | 160 | 162 | 174 | 172 |
| Block Copolymer Composition/Polystyrene 60 mass %/40 mass % Mixture Sheet Physical Properties | Modulus of tensile elasticity [MPa] | 1310 | 1130 | 1270 | 1290 |
|  | Elongation [%] | 63 | 179 | 97 | 73 |
|  | Sheet impact [kJ/m] | 3.3 | 4.9 | 3.5 | 3.0 |
|  | Haze [%] | 2.0 | 4.4 | 1.5 | 2.6 |
|  | Gloss [%] | 161 | 150 | 162 | 158 |
| Block Copolymer Composition/Polystyrene 40 mass %/60 mass % Mixture Sheet Physical Properties | Modulus of tensile elasticity [MPa] | 1550 | 1410 | 1500 | 1450 |
|  | Elongation [%] | 27 | 95 | 43 | 35 |
|  | Sheet impact [kJ/m] | 2.2 | 4.7 | 2.5 | 2.5 |
|  | Haze [%] | 2.4 | 5.1 | 2.0 | 2.6 |
|  | Gloss [%] | 159 | 151 | 158 | 161 |

TABLE 3

|  |  | Comp Ex 1 | Comp Ex 2 | Comp Ex 3 | Comp Ex 4 | Comp Ex 5 |
|---|---|---|---|---|---|---|
| Block Copolymer Composition Blend | Type of block copolymer component (I) | (B) | (G) | (D) | (F) | (H) |
|  | Molecular weight peak area ratio [%] | 70 | 50 | 65 | 60 | 31 |
|  | Type of block copolymer component (II) | (M) | (J) | (K) | (M) | (O) |
|  | Molecular weight peak area ratio [%] | 30 | 50 | 35 | 40 | 69 |
| General Physical Properties of Block Copolymer Composition | Vicat softening temperature [° C.] | 66 | 62 | 91 | 70 | 76 |
|  | Bending strength [MPa] | 16 | 14 | 40 | 47 | 21 |
|  | Elongation (nominal tensile strain at break) [%] | 411 | 465 | 21 | 120 | 181 |
|  | Haze [%] | 52 | 37 | 2.9 | 72 | 30 |
|  | Gloss [%] | 53 | 94 | 160 | 30 | 95 |
| Block Copolymer Composition/Polystyrene 60 mass %/40 mass % Mixture Sheet Physical Properties | Modulus of tensile elasticity [MPa] | 950 | 880 | 1390 | 1480 | 1250 |
|  | Elongation [%] | 340 | 360 | 20 | 36 | 41 |
|  | Sheet impact [kJ/m] | 4.8 | 5.2 | 2.2 | 2.5 | 2.5 |
|  | Haze [%] | 21 | 18 | 4.8 | 24 | 18 |
|  | Gloss [%] | 148 | 151 | 158 | 143 | 153 |
| Block Copolymer Composition/Polystyrene 40 mass %/60 mass % Mixture Sheet Physical Properties | Modulus of tensile elasticity [MPa] | 1310 | 1230 | 1580 | 1570 | 1430 |
|  | Elongation [%] | 172 | 190 | 7 | 16 | 22 |
|  | Sheet impact [kJ/m] | 4.9 | 5.3 | 1.8 | 1.8 | 2.2 |
|  | Haze [%] | 26 | 20 | 5.3 | 22 | 15 |
|  | Gloss [%] | 143 | 150 | 157 | 145 | 154 |

Next, for the block copolymer compositions of Table 2 and Table 3, each block copolymer composition was pellet-blended well with a polystyrene (Toyo Styrene Toyostyrol GP, grade G200C), then extruded into sheet form from a T-die of lip spacing 0.65 mm while melt-mixing at 200° C. using a Tanabe Plastics sheet extruder (screw diameter 40 mm, fully flighted type screws). The extruded sheets were drawn onto two specularly finished rolls at 50° C. and cooled, to obtain sheets of average thickness 0.6 mm at a speed of 0.9 m/min. The measurement results for sheet properties depending on the mixing ratio between the block copolymer composition and polystyrene (block copolymer composition mass %/polystyrene mass %) are shown together in Table 2 and Table 3. The tensile elasticity, elongation, sheet impact, haze and gloss of the sheets were measured in accordance with the following methods.

[Evaluation of Tensile Elasticity and Elongation]

The tensile elasticity of the sheets was measured by punching out dumbbell shaped pieces aligned with the manufacturing direction of the sheets (hereinafter referred to as MD) using a Tensilon Universal Material Testing Instrument RTG-1210 (product of A&D) at a tension speed of 10 mm/min and a distance of 50 mm between chucks. Additionally, the elongation of the sheet (elongation until rupture) was measured together with the above-described measurement of the tensile elasticity.

[Evaluation of Sheet Impact]

The sheet impact (sheet impact strength) was measured by punching with an impact weight of diameter 10 mm in accordance with ASTM D-3420 using an impact tester (product of Tester Sangyo).

[Evaluation of Haze]

The haze of the sheet was measured in accordance with ISO 14782 (JIS K7136) using a Haze Meter NDH 2000 (product of Nippon Denshoku Industries).

[Evaluation of Gloss]

The gloss of the sheet was measured as the gloss value at an angle of incidence of 60° in accordance with ISO 2813 (JIS Z8741) using a Gloss Meter VG 2000 (product of Nippon Denshoku Industries).

Next, an optional lubricant was mixed with the aforementioned block copolymer composition, resulting in the block copolymer compositions of Examples 5-10 shown in Table 4 and Comparative Examples 6-10 shown in Table 5. After sufficiently pellet-blending the block copolymer composition and a polystyrene (Toyo Styrene Toyostyrol GP grade G200C) at a mixing ratio (mass % of block copolymer composition/mass % of polystyrene) of 70 mass %/30 mass %, a Tanabe Plastics sheet extruder (screw diameter 40 mm, fully flighted type screws) was used to extrude the composition in the form of a sheet from a T-die with a lip spacing of 0.65 mm while melt-mixing at 200° C. The extruded sheets were drawn onto two specularly finished rolls at 50° C. and cooled, to obtain sheets of average thickness 0.30 mm at a manufacturing speed of 1.9 m/min. The anti-blocking properties of the manufactured sheets were evaluated as follows.

[Evaluation of Anti-blocking Properties]

After producing sheets of average thickness 0.30 mm, they were wound continuously for 5 minutes onto a paper tube of diameter 90 mm to form rolls. Using the same technique, two rolls of each type were produced, and the rolls were respectively stored in a 23° C. environment and a 40° C. environment. After storing for 24 hours in the aforementioned predetermined temperature environments, the rolls were removed and the peelability when peeling the sheets from the rolls was evaluated according to the following criteria. The results are shown in Table 4 and Table 5.

Good: The sheet could be easily peeled, and there were no abnormalities in the appearance of the peeled sheet.

Pass: The sheet could be peeled, but there was some resistance at the time of peeling, or peeling was accompanied by abnormal noises.

Fail: The sheets were blocked, damaged when peeled, or there were abnormalities in the appearance such as ruptures or the like.

Furthermore, after manufacturing the block copolymer compositions of Examples 5 to 10 and Comparative Examples 6 to 12, the above-described block copolymer compositions and a polystyrene (Toyo Styrene Toyostyrol GP grade G200C) were pellet-blended at a mixing ratio (mass % of block copolymer composition/mass % of polystyrene) of 70 mass %/30 mass %, and a Tanabe Plastics sheet extruder (screw diameter 40 mm, fully flighted type screws) was used to extrude the composition in the form of a sheet from a T-die with a lip spacing of 0.65 mm while melt-mixing at 200° C. The extruded sheets were drawn onto two specularly finished rolls at 50° C. and cooled, to obtain sheets of average thickness 0.60 mm at a manufacturing speed of 0.9 m/min. The manufactured sheets were vacuum-formed at 110° C. using component tray molds of tray depth 19 mm, in a pressure/vacuum forming machine for use in research and development, manufactured by Asano Laboratories. The anti-sticking properties of the manufactured formed articles were evaluated as follows.

[Evaluation of Anti-sticking Properties]

The vacuum-formed trays were stored for 24 hours in a 23° C. environment in stacks of five, and the time [seconds] required to artificially separate the trays stacked under their own weight was measured as an evaluation of the anti-sticking properties. Furthermore, the number of seconds required for separation of the component trays stored for 7 days after forming in a 23° C. environment was ranked for the degree of anti-sticking properties in accordance with the following criteria. The measurement results are shown in Table 4 and Table 5.

Good: Separation time 7 seconds or less.

Pass: Separation time 10 seconds or less.

Fail: Separation time 11 seconds or more.

TABLE 4

| | | | Ex 5 | Ex 6 | Ex 7 | Ex 8 |
|---|---|---|---|---|---|---|
| Block Copolymer Composition Blend | Block Copolymer Composition Type | Block Copolymer Content [mass %] | Ex 2 99.76 | Ex 3 99.70 | Ex 1 99.60 | Ex 4 99.60 |
| | Hydrocarbon Wax | Hydrocarbon Wax Type | polyethylene wax | Fischer-Tropsch wax | microcrystalline wax | microcrystalline wax |
| | | Manufacturer and Product Name | Baker Petrochemical Polywax 300 | Nippon Seiki HNP-51 | Nippon Seiki Himic 1090 | Nippon Seiki Himic 2045 |
| | | Melting Point [° C.] | 94 | 77 | 87 | 66 |
| | | Amount Added [mass %] | 0.24 | 0.3 | 0.4 | 0.3 |
| | Lubricants Other Than Hydrocarbon Wax | Lubricant Type | — | — | — | stearic acid monoglyceride |
| | | Manufacturer and Product Name | — | — | — | Riken Vitamin Poem V-100 |

TABLE 4-continued

|  |  |  |  |  |  |  |
|---|---|---|---|---|---|---|
|  |  | Melting Point [° C.] | — | — | — | 67 |
|  |  | Content of Other Lubricants [mass %] | — | — | — | 0.1 |
| Resin Composition with Polystyrene | Anti-blocking Properties | Roll Surface Temperature [° C.] when winding | 26 | 26 | 25 | 26 |
|  |  | Stored at 23° C. | good | good | good | pass |
|  |  | Stored at 40° C. | good | pass | good | pass |
|  | Anti-sticking Properties | Time [sec] to separate after 24 hours' storage | 20 | 15 | 13 | 12 |
|  |  | Time [sec] to separate after 7 days' storage | 10 | 9 | 8 | 6 |
|  |  | Anti-sticking properties | pass | pass | pass | good |

|  |  |  |  | Ex 9 | Ex 10 |
|---|---|---|---|---|---|
| Block Copolymer Composition Blend | Block Copolymer Composition Type | Block Copolymer Content [mass %] | | Ex 2 99.60 | Ex 3 99.60 |
|  | Hydrocarbon Wax | Hydrocarbon Wax Type | | microcrystalline wax and synthetic hydrocarbon mixture | microcrystalline wax and synthetic hydrocarbon mixture |
|  |  | Manufacturer and Product Name | | Baker Petrochemical Be square 195 white | Nippon Seiki Himic 2095 |
|  |  | Melting Point [° C.] | | 93 | 100 |
|  |  | Amount Added [mass %] | | 0.1 | 0.2 |
|  | Lubricants Other Than Hydrocarbon Wax | Lubricant Type | | stearyl stearate | erucamide |
|  |  | Manufacturer and Product Name | | Riken Vitamin Rikemal SL-800 | Kao Fatty Acid Amide E |
|  |  | Melting Point [° C.] | | 56 | 82 |
|  |  | Content of Other Lubricants [mass %] | | 0.3 | 0.2 |
| Resin Composition with Polystyrene | Anti-blocking Properties | Roll Surface Temperature [° C.] when winding | | 25 | 26 |
|  |  | Stored at 23° C. | | good | good |
|  |  | Stored at 40° C. | | good | good |
|  | Anti-sticking Properties | Time [sec] to separate after 24 hours' storage | | 6 | 7 |
|  |  | Time [sec] to separate after 7 days' storage | | 2 | 2 |
|  |  | Anti-sticking properties | | good | good |

TABLE 5

|  |  |  | Co Ex 6 | Co Ex 7 | Co Ex 8 | Co Ex 9 |
|---|---|---|---|---|---|---|
| Block Copolymer Composition Blend | Block Copolymer Composition Type | Block Copolymer Composition Type Content [mass %] | Co Ex 4 99.90 | Co Ex 3 99.76 | Co Ex 3 99.60 | Co Ex 2 99.70 |
|  | Hydrocarbon Wax | Hydrocarbon Wax Type | paraffin wax | polyethylene wax | — | — |
|  |  | Manufacturer and Product Name | Nippon Seiki Paraffin wax 130 | Baker Hughes Polywax 3000 | — | — |
|  |  | Melting Point [° C.] | 56 | 129 | — | — |
|  |  | Amount Added [mass %] | 0.1 | 0.24 | — | — |
|  | Lubricants Other Than Hydrocarbon Wax | Lubricant Type | — | — | stearyl stearate | ethylene bistearic acid amide |
|  |  | Manufacturer and Product Name | — | — | Riken Vitamin Rikemal SL-800 | Kao Car Wax EB-FF |
|  |  | Melting Point [° C.] | — | — | 56 | 144 |
|  |  | Content of Other Lubricants [mass %] | — | — | 0.4 | 0.3 |
| Resin Composition with Polystyrene | Anti-blocking Properties | Roll Surface Temperature [° C.] when winding | 25 | 25 | 26 | 26 |
|  |  | Stored at 23° C. | pass | pass | fail | fail |
|  |  | Stored at 40° C. | fail | pass | fail | fail |
|  | Anti-sticking Properties | Time [sec] to separate after 24 hours' storage | 22 | 64 | 5 | 35 |
|  |  | Time [sec] to separate after 7 days' storage | 13 | 73 | 2 | 28 |
|  |  | Anti-sticking properties | fail | fail | good | fail |

|  |  |  | Co Ex 10 | Co Ex 11 | Co Ex 12 |
|---|---|---|---|---|---|
| Block Copolymer Composition Blend | Block Copolymer Composition Type | Block Copolymer Composition Type Content [mass %] | Co Ex 4 99.78 | Co Ex 1 98.90 | Co Ex 4 98.90 |
|  | Hydrocarbon Wax | Hydrocarbon Wax Type | microcrystalline wax | polyethylene wax | paraffin wax |

TABLE 5-continued

| | | Manufacturer and Product Name | Nippon Seiki Himic 1080 | Baker Hughes Polywax 600 | Nippon Seiki Paraffin wax 125 |
|---|---|---|---|---|---|
| | | Melting Point [° C.] | 83 | 94 | 53 |
| | | Amount Added [mass %] | 0.02 | 0.8 | 0.2 |
| | Lubricants Other Than Hydrocarbon Wax | Lubricant Type | oliec acid amide | stearic acid monoglyceride | pentaerythritol fatty acid ester |
| | | Manufacturer and Product Name | Nihon Kasei Diamond O-200 | Riken Vitamin Poem 100 | Riken Vitamin Rikemal HT-10 |
| | | Melting Point [° C.] | 75 | 67 | 53 |
| | | Content of Other Lubricants [mass %] | 0.2 | 0.3 | 0.9 |
| Resin Composition with Polystyrene | Anti-blocking Properties | Roll Surface Temperature [° C.] when winding | 25 | 27 | 26 |
| | | Stored at 23° C. | fail | good | pass |
| | | Stored at 40° C. | fail | good | fail |
| | Anti-sticking Properties | Time [sec] to separate after 24 hours' storage | 31 | 53 | 9 |
| | | Time [sec] to separate after 7 days' storage | 24 | 38 | 7 |
| | | Anti-sticking properties | fail | fail | good |

The results of Table 2 and Table 3 show that by using the block copolymer composition of the present invention, a good balance of transparency, gloss, rigidity, strength and formability is achieved, and it can be favorably used without considerably reducing the transparency and gloss even as a resin composition with a vinyl aromatic hydrocarbon polymer. Furthermore, the results of Table 4 and Table 5 show that superior anti-blocking properties and anti-sticking properties can be achieved by using a specific lubricant. As a result, packages of various shapes can be easily produced and applied by using the block copolymer composition of the present invention.

INDUSTRIAL APPLICABILITY

The block copolymer composition of the present invention is a material suitable for production and use in various types of packaging in diverse forms, and sheets using this material can be used for food product containers, beverage containers, industrial containers and blister packs. Aside from the above, it can be favorably used in applications for injection molding or profile extrusion.

The invention claimed is:

1. A block copolymer composition, comprising a block copolymer component (I) and a block copolymer component (II),
wherein the block copolymer component (I) and the block copolymer component (II) both comprise a vinyl aromatic hydrocarbon and a conjugated diene,
the block copolymer component (I) and the block copolymer component (II) both comprise a tapered block wherein the component ratios of the vinyl aromatic hydrocarbon and the conjugated diene change from one end to the other end of the block, and a vinyl aromatic hydrocarbon polymer block,
the block copolymer component (I) has a molecular weight peak in the range of molecular weight 150,000 to 300,000 in terms of molecular weight distribution obtained by gel permeation chromatography,
the block copolymer component (II) has a molecular weight peak in the range of molecular weight 50,000 to 140,000 in terms of molecular weight distribution obtained by gel permeation chromatography,
the content of the conjugated diene in the block copolymer component (I) is 10 to 20 mass %,
the content of the conjugated diene in the block copolymer component (II) is 30 to 50 mass %, and
the ratio (I)/(II) between molecular weight peak areas occupied by block copolymer component (I) and block copolymer component (II) in the block copolymer composition obtained by gel permeation chromatography is 20/80 to 80/20.

2. The block copolymer composition of claim 1, wherein block copolymer component (I) has a molecular weight peak in the range of molecular weight 180,000 to 290,000 and the conjugated diene content in block copolymer component (I) is 10 to 15 mass %; block copolymer component (II) has a molecular weight peak in the range of molecular weight 50,000 to 140,000 and the conjugated diene content in block copolymer component (II) is 30 to 50 mass %; and the ratio (I)/(II) between molecular weight peak areas occupied by block copolymer component (I) and block copolymer component (II) in the block copolymer composition is 40/60 to 60/40.

3. The block copolymer composition of claim 1, wherein the molecular weight range of the vinyl aromatic hydrocarbon polymer block in the block copolymer component (I) is 80,000 to 150,000; and the molecular weight range of the vinyl aromatic hydrocarbon polymer block in the block copolymer component (II) is 5,000 to 40,000.

4. The block copolymer composition of claim 1, comprising a total amount of 0.03 to 1.0 mass % in the block copolymer composition of a single hydrocarbon wax, or at least one chosen from among hydrocarbon waxes, stearyl stearate, stearic acid monoglyceride, erucamide and behenamide.

5. The block copolymer composition of claim 4, wherein the hydrocarbon wax is a microcrystalline wax, a synthetic wax, or a mixture of a microcrystalline wax and a synthetic wax having a melting point of 60 to 120° C., and is contained in the block copolymer composition in an amount of 0.03 to 0.5 mass %.

6. The block copolymer composition of claim 5, wherein the hydrocarbon wax has a melting point of 80 to 110° C.

7. The block copolymer composition of claim 4, comprising a total amount of 0.03 to 0.5 mass % in the block copolymer composition of a lubricant chosen from among stearyl stearate, stearic acid monoglyceride, erucamide and behenamide.

8. A resin composition comprising the block copolymer composition of claim 1 and a vinyl aromatic hydrocarbon polymer at a mass ratio of 30/70 to 100/0.

9. A sheet comprising the block copolymer composition of claim 1.

10. A sheet comprising the resin composition of claim 8.

11. A container comprising the block copolymer composition of claim 1.

12. A container comprising the resin composition of claim 8.

13. A container comprising the sheet of claim 9.

14. A resin composition comprising the block copolymer composition of claim 4 and a vinyl aromatic hydrocarbon polymer at a mass ratio of 30/70 to 100/0.

* * * * *